US006623395B2

(12) United States Patent
Lovatt

(10) Patent No.: US 6,623,395 B2
(45) Date of Patent: *Sep. 23, 2003

(54) TORQUE LIMITING CHAIN SPROCKET ASSEMBLY

(75) Inventor: Andrew Brian Lovatt, Novi, MI (US)

(73) Assignee: BorgWarner, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/003,564

(22) Filed: Oct. 24, 2001

(65) Prior Publication Data

US 2003/0032519 A1 Feb. 13, 2003

Related U.S. Application Data

(63) Continuation-in-part of application No. 09/928,278, filed on Aug. 10, 2001.

(51) Int. Cl.[7] .............................................. B60K 17/344
(52) U.S. Cl. ...................... 475/204; 180/248; 192/56.6; 464/46
(58) Field of Search .............................. 464/45, 46, 47, 464/48; 192/56.6; 475/204, 206; 180/248

(56) References Cited

U.S. PATENT DOCUMENTS

| | | | |
|---|---|---|---|
| 2,977,779 A | * | 4/1961 | Steinke et al. ................ 464/48 |
| 3,901,092 A | * | 8/1975 | Romick ...................... 475/249 |
| 4,132,297 A | | 1/1979 | Brown et al. |
| 4,762,021 A | | 8/1988 | Teraoka |
| 5,281,190 A | | 1/1994 | Koivunen |
| 5,407,024 A | | 4/1995 | Watson et al. |
| 5,485,894 A | | 1/1996 | Watson et al. |
| 5,551,917 A | * | 9/1996 | Wood ........................... 464/46 |
| 5,702,321 A | * | 12/1997 | Bakowski et al. .......... 475/199 |
| 5,966,999 A | | 10/1999 | Showalter et al. |
| 6,079,535 A | | 6/2000 | Mueller et al. |
| 6,155,395 A | * | 12/2000 | Braford, Jr. ................. 475/206 |
| 6,464,608 B2 | * | 10/2002 | Bowen et al. ................. 475/5 |

* cited by examiner

Primary Examiner—Ankur Parekh
(74) Attorney, Agent, or Firm—Brinks, Hofer, Gilson & Lione

(57) ABSTRACT

A chain sprocket assembly for use in a motor vehicle transfer case having an inter-axle differential includes a torque limiting clutch which limits the torque provided to a secondary drive line. The chain sprocket assembly includes a chain receiving hub having a splined interconnection which drives an outer bell housing having internal splines which drive a first set of friction clutch plates. A second set of friction clutch plates are interleaved with the first set of clutch plates and are splined to and drive a stub shaft. The stub shaft also freely rotatably receives the chain hub and functions as the secondary output to drive a secondary drive line. A biasing spring engages the clutch plates and compresses them and achieves a desired maximum torque throughput from the chain to the secondary output shaft. In operation, the chain sprocket assembly will transmit torque to the secondary output shaft and the secondary drive line up to the preset maximum and which threshold the friction clutch packs will slip, thus limiting torque throughput to the preselected level.

20 Claims, 6 Drawing Sheets

TORQUE LIMITING CHAIN SPROCKET ASSEMBLY

CROSS REFERENCE TO CO-PENDING APPLICATION

This patent application is a continuation-in-part of U.S. patent application Ser. No. 09/928,278, filed Aug. 10, 2001.

BACKGROUND OF THE INVENTION

The invention relates generally to a torque limiting sprocket assembly and more particularly to a chain sprocket assembly having an integral torque limiting clutch. The assembly may be advantageously, though not exclusively, used in motor vehicle transfer cases and other vehicle power train components.

The delivery of power and specifically drive torque in a four-wheel drive motor vehicle from a primary drive line which is continuously active to a secondary drive line which may deliver torque to a secondary set of drive wheels on a part time basis is the subject of much study and innumerable mechanical configurations and operating routines. Broadly speaking, an energy transfer device operably resides between the primary and secondary drive lines in a transfer case and delivers torque from the primary drive line to the secondary drive line. The energy transfer device may take many forms: an inter-axle differential, a two state device such as a dog clutch having only engaged and released operating states, an overrunning clutch which engages only when a speed difference exists between the drive lines, a viscous clutch which provides increasing resistance and torque transfer with increasing speed difference between the drive lines and an electrically or hydraulically modulatable friction clutch which may be controlled according to diverse programs and operating sequences to apportion torque delivery to the drive lines from 100% to the primary drive line (0% to the secondary drive line) to a 50%—50% torque split between the drive lines and typically at many or an infinite number of levels therebetween.

Particularly in the two stage (on-off) and inter-axle differential systems but in the overrunning, viscous and modulatable systems as well, it may be beneficial to limit the maximum torque delivered to the secondary drive line wheels. For example, a particular vehicle weight, weight distribution or intended service environment may dictate limiting the torque delivered to the secondary (typically front) axle and wheels of a four wheel drive vehicle in order to provide optimum performance. Similarly, it may be desirable from an overall vehicle operation standpoint to limit the maximum torque delivered to the secondary axle and wheels.

The present invention relates to a torque limiting assembly which may be disposed integrally with one the chain sprockets in a chain drive assembly of a typical transfer case.

BRIEF SUMMARY OF THE INVENTION

A chain sprocket assembly for use in a motor vehicle transfer case having an inter-axle differential includes a torque limiting clutch which limits the torque provided to a secondary drive line. The chain sprocket assembly includes a chain receiving hub having a splined interconnection which drives an outer bell housing having internal splines which drive a first set of friction clutch plates. A second set of friction clutch plates are interleaved with the first set of clutch plates and are splined to and drive a stub shaft. The stub shaft also freely rotatably receives the chain hub and functions as the secondary output to drive a secondary drive line. A biasing spring engages the clutch plates and compresses them and achieves a desired maximum torque throughput from the chain to the secondary output shaft. In operation, the chain sprocket assembly will transmit torque to the secondary output shaft and the secondary drive line up to the preselected maximum at which threshold the friction clutch pack will slip, thus limiting torque throughput to the preselected level. Two alternate embodiments of the torque limiting chain drive sprocket assembly are also disclosed.

Thus, it is an object of the present invention to provide a chain sprocket having an integral torque limiting clutch.

It is a further object of the present invention to provide a chain sprocket having an integral torque limiting clutch which may be disposed in a transfer case or other motor vehicle power train component.

It is a still further object of the present invention to provide a torque limiting clutch assembly which may be disposed within a chain sprocket in the chain drive assembly of a motor vehicle transfer case or similar vehicle power train component.

Further objects and advantages of the present invention will become apparent by reference to the following description of the preferred and alternate embodiments and appended drawings wherein like reference numbers refer to the same component, element or feature.

DETAILED DESCRIPTION OF THE PREFERRED AND ALTERNATE EMBODIMENTS

Figure 1:
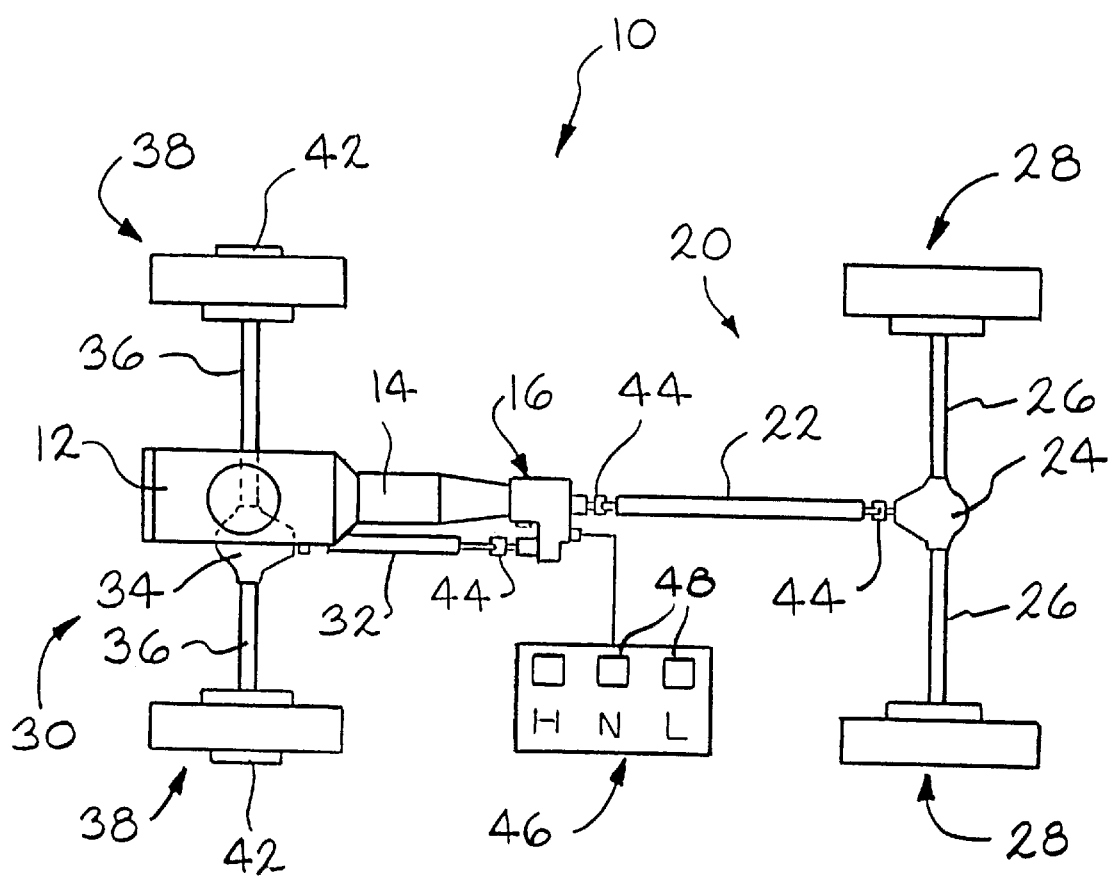
FIG. 1 is a diagrammatic, plan view of a four-wheel drive motor vehicle having a transfer case incorporating a chain sprocket assembly according to the present invention.

Referring now to FIG. 1, a four-wheel vehicle drive train is diagrammatically illustrated and designated by the reference number 10. The four-wheel vehicle drive train 10 includes a prime mover 12 which is coupled to and directly drives a transmission 14. The transmission 14 may either be an automatic or manual type. The output of the transmission 14 directly drives a transfer case assembly 16 which provides motive power to a primary or rear drive line 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front drive line 30 comprising a secondary or front prop shaft 32, a secondary or front differential assembly 34, a pair of live secondary or front axles 36 and a respective pair of secondary or front tire and wheel assemblies 38. The front tire and wheel assemblies 38 may be directly coupled to a respective one of the pair of front axles 36 or, if desired, a pair of manually or remotely activateable locking hubs 42 may be operably disposed between the pair of front axles 36 and a respective one of the tire and wheel assemblies 38 to selectively connect same. Finally, both the primary drive line 20 and the secondary drive line 30 may include suitable and appropriately disposed universal joints 44 which function in conventional fashion to allow static and dynamic offsets and misalignments between the various shafts and components. A control console 46 which is preferably disposed within convenient reach of the vehicle operator includes a switch or a plurality of individual switches or push buttons 48 which facilitate selection of the operating mode of the transfer case assembly 16 as will be further described below.

The foregoing and following description relates to a vehicle wherein the rear drive line 20 functions as the primary drive line, i.e., it is engaged and operates substantially all the time and, correspondingly, the front drive line 30 functions as the secondary drive line, i.e., it is engaged and operates only part-time or in a secondary or supplemental fashion.

These designations "primary" and "secondary" are utilized herein rather than "front" and "rear" inasmuch as the invention herein disclosed and claimed may be readily utilized in transfer cases wherein the primary drive line 20 is disposed at the front of the vehicle and the secondary drive line 30 is disposed at the rear of the vehicle. Such designations "primary" and "secondary" thus broadly and properly characterize the function of the individual drive lines rather than their specific locations.

Figure 2:
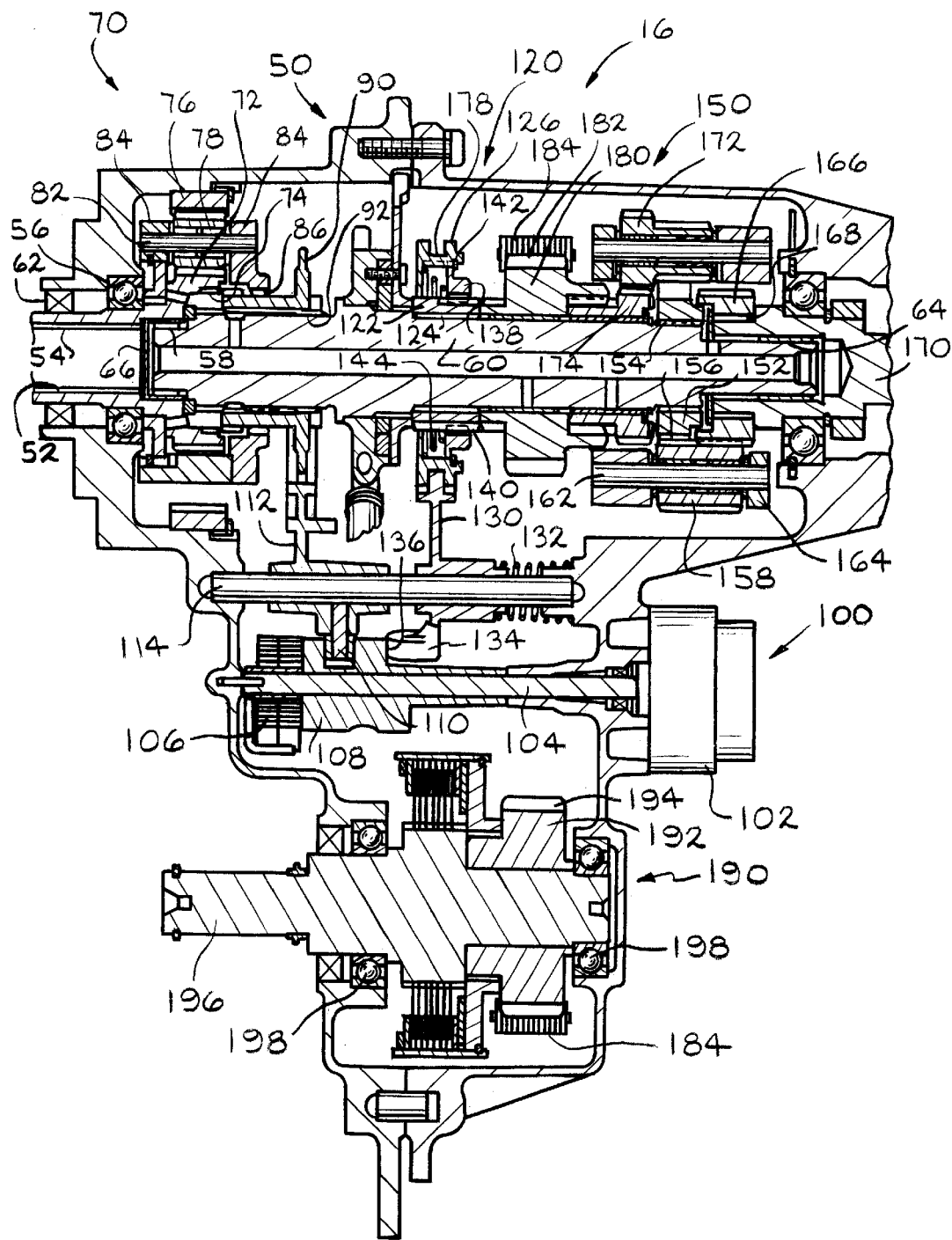
FIG. 2 is full, sectional view of a transfer case incorporating a chain sprocket assembly according to the present invention.

Referring now to FIGS. 1 and 2, the transfer case assembly 16 incorporating the present invention includes a multiple piece, typically cast, housing assembly 50 having planar and circular sealing surfaces, openings for shafts and bearings and various recesses, shoulders, flanges, counterbores and the like to receive various components and assemblies of the transfer case assembly 16. An input shaft 52 includes female or internal splines or gear teeth 54 or other suitable structure which drivingly couple an output of the transmission 14 illustrated in FIG. 1 to the input shaft 52. The input shaft 52 is rotatably supported by anti-friction bearings such as the bearing assembly 56 and internally by an anti-friction bearing such as the roller bearing assembly 58. The roller bearing assembly 58 is disposed upon a reduced diameter portion of an intermediate shaft 60. A suitable oil seal 62, positioned between the input shaft 52 and the housing assembly 50, provides an appropriate fluid tight seal therebetween. The opposite end of the intermediate shaft 60 is supported by a journal bearing 64. An end cap or seal 66 closes off the forward (left) end of an axial passageway 68 in the intermediate shaft 60. A gerotor pump P will typically be utilized to provide a flow of lubricating and cooling fluid to the axial passageway 68 which is thence distributed through a plurality of radial ports in the intermediate shaft 60 to the components of the transfer case assembly 16.

The transfer case assembly 16 also includes a two-speed planetary (epicyclic) gear speed reduction assembly 70 disposed generally about the input shaft 52. The planetary gear assembly 70 includes a sun gear 72 having internal splines or gear teeth which are engaged and driven by external splines or gear teeth 74 on the input shaft 52.

Radially aligned with the sun gear 72 is a ring gear 76. The ring gear 76 is fixedly retained within the housing assembly 50 by any suitable retaining structure such as a snap ring. A plurality of pinion gears 78 are rotatably received upon a like plurality of anti-friction roller bearings which, in turn, are supported and located by a like plurality of stub shafts 82. The plurality of stub shafts 82 are mounted within and secured to a planet carrier 84. The planet carrier 84 includes a plurality of internal splines or gear teeth 86. The planetary gear assembly 70 is more fully described in co-owned U.S. Pat. No. 4,440,042 which is herein incorporated by reference.

Adjacent and cooperating with the planetary gear assembly 70 is a dog clutch 90 having elongate internal splines or gear teeth which are slidably received upon a complementary plurality of external splines or gear teeth 92 on the intermediate shaft 60. The clutch collar 90 thus rotates with the intermediate shaft 60 but may translate bi-directionally therealong. The dog clutch 90 also includes a set of external splines or gear teeth 94 on one end which are in all respects complementary to the internal splines or gear teeth 86 on the planet carrier 84. The end of the clutch collar 90 opposite the splines or gear teeth 94 defines a circumferentially and radially extending flange 96.

The dog clutch 90 is capable of three positions and operational modes. In FIG. 2, the dog clutch 90 is illustrated in its center or neutral position wherein both the input shaft 52 and the planet carrier 84 are disconnected from the intermediate shaft 60 and no power is transmitted therebetween. When translated to the left, direct drive is achieved when the internal splines or gear teeth of the dog clutch 90 engage the external splines or gear teeth 74 on the sun gear 72 thereby directly coupling the input shaft 52 to the intermediate shaft 60 and providing direct or high gear drive therebetween.

When the dog clutch 90 is moved to the right from the position illustrated in FIG. 2, the speed reduction achieved by the planetary gear assembly 70 is engaged through engagement of the external splines or gear teeth 94 on the dog clutch 90 with the internal splines or gear teeth 86 on the planet carrier 84. So engaged, the planetary gear assembly 70 is active and provides a speed reduction, typically in the range of from 3:1 to 4:1 between the input shaft 52 and the intermediate shaft 60.

The position of the clutch collar 90 is commanded by an electric shift control assembly 100. The shift control assembly 100 includes an electric drive motor 102 which receives control signals or instructions originating with the switches or push buttons 48. The drive motor 102 has an output shaft 104 coupled, preferably through an energy storing spring 106, to a cam body 108 which axially positions a cam follower 110. The cam follower 110 translates a shift fork 112 slidably disposed upon a shift rail 114 which engages the flange 96 of the dog clutch 90.

Figure 3:
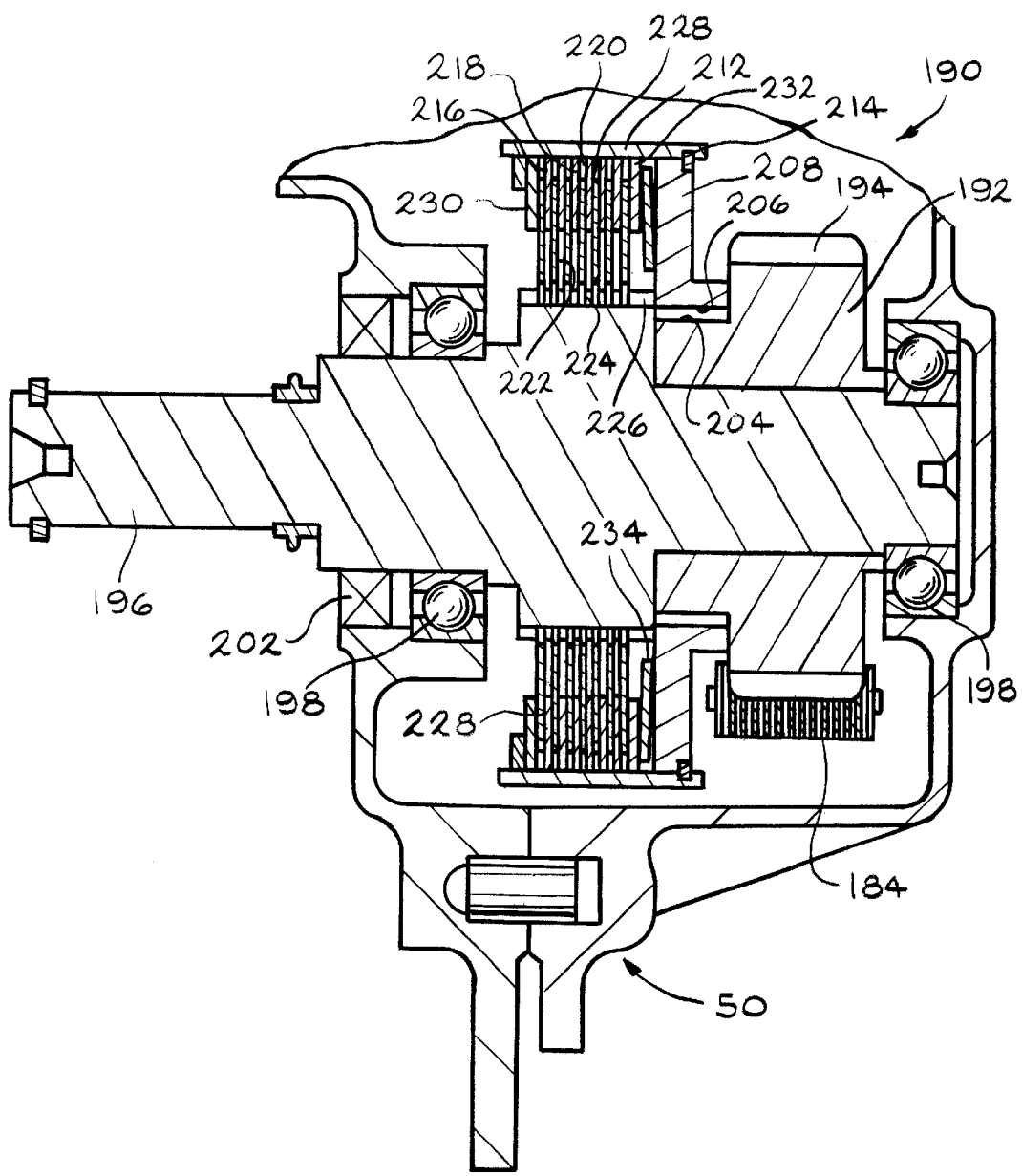
FIG. 3 is an enlarged, fragmentary, sectional view of a preferred embodiment of a chain sprocket assembly according to the present invention.

The transfer case assembly 16 also includes an electrically actuated lock up or locking clutch assembly 120. The locking clutch assembly 120 is disposed about the intermediate shaft 60 and includes a clutch hub 122 which is coupled to the intermediate shaft 60 by sets of interengaging splines 124. A clutch actuating collar 126 is fixedly received upon the clutch collar 122 and includes a circumferential groove 128 which receives a complementarily configured portion of a shift fork 130. The shift fork 130 is axially slidably received upon the shift rail 114 and is biased to the left as illustrated in FIG. 3 by a compression spring 132. The shift fork 130 also includes a cam follower 134 which engages a helical surface 136 of the cam body 108. Activation of the electric motor 102 and rotation of the output shaft 104 rotates the cam body 108 and translates the shift fork 130 and the clutch actuating collar 126 bi-directionally.

Disposed generally between the clutch hub 122 and the shift actuating collar 126 is a clutch collar 138. The clutch collar 138 is rotationally coupled to both the clutch hub 122 and the clutch actuating collar 126 by sets of interengaging splines 140 on the members. A snap ring 142 limits axial translation of the clutch collar 138 relative to the clutch actuating collar 126. A compression spring 144 is disposed between the clutch collar 138 and the clutch actuating collar 126 and biases the clutch collar 138 to the right as illustrated in FIG. 2.

The transfer case assembly 16 also includes a planetary (epicyclic) interaxle differential assembly 150. The interaxle differential assembly 150 includes a sun gear 152 which is coupled to the intermediate shaft 60 by a set of interengaging splines or gear teeth 154. The sun gear 152 includes gear teeth 156 which engage and drive a first plurality of planet gears 158. The first plurality of planet gears 158 are disposed upon a first plurality of stub shafts 162 which are received within a carrier 164. The first plurality of planet gears 158 engage and drive a first output collar 166 which is coupled by a set of interengaging splines 168 to a primary output shaft 170. The first plurality of planet gears 158 also engage respective ones of a circumferentially adjacent second plurality of planet gears 172. The second plurality of planet gears 172 engage a second output collar 174 which is journaled about the intermediate shaft 60. The second output collar 174 includes a plurality of external splines or gear teeth 176 which mate with a complementarily configured plurality of female splines or gear teeth 178 on a chain drive sprocket 180.

The chain drive sprocket 180 is journaled about the intermediate shaft 60 and includes chain drive teeth 182 which receive, engage and drive a chain 184. The chain drive sprocket 180 also includes female splines or gear teeth 186 which are disposed adjacent the splines 140 on the clutch hub 122. When the clutch collar 138 is in the position illustrated in FIG. 2, the chain drive sprocket 180 is driven by the second output collar 174 of the differential assembly 150 and a speed difference may exist between the primary output shaft 170 and the chain drive sprocket 180. When the clutch collar 138 is translated to the right as viewed in FIG. 2, the clutch collar 138 bridges and couples the clutch hub 122 to the chain drive sprocket 180 thereby locking the chain drive sprocket 180 to the intermediate shaft 60 and effectively inhibiting differentiation by the interaxle differential assembly 150.

Referring now to FIGS. 2 and 3, the transfer case assembly 15 also includes a torque limiting assembly 190. The torque limiting assembly 190 is disposed within the housing assembly 50 and is offset from the common axis of the input shaft 52, the intermediate shaft 60 and the primary output shaft 170. The torque limiting assembly 190 includes a driven chain sprocket 192 having suitable chain engaging teeth 194 upon which is received the chain 184. The driven chain sprocket 192 is freely rotatably disposed about a stepped secondary output shaft 196. The stepped secondary output shaft 196 is freely rotatably supported by an axially spaced apart pair of anti-friction bearings such as the ball bearing assemblies 198. An oil seal 202 provides a fluid tight seal between the secondary output shaft 196 and the housing assembly 50.

The driven chain sprocket 192 includes external or male splines or gear teeth 204 which receive and are engaged by complementarily configured female splines or gear teeth 206 on a circular drive member 208. The circular drive member 208 is secured by any suitable means to an annular drive member 212 which may include a locating ring 214. The circular drive member 208 and the annular drive member 212 together define a bell housing or L-shaped housing. The annular drive member 212 includes internal splines or gear teeth 216 which receive and engage a plurality of larger diameter friction clutch plates 218 having complementarily configured splines or gear teeth 220. Interleaved with the first plurality of larger diameter clutch plates 218 is a second plurality of smaller diameter clutch plates 222 having internal or female splines or gear teeth 224 which are received upon and engage external or male splines or gear teeth 226 on the secondary output shaft 196. The friction clutch plates 218 and 222 include appropriately disposed friction clutch material 228 such that each of the interleaved clutch plates 218 and 222 is separated from an adjacent plate by such friction clutch material 228. The friction clutch plates 218 and 222 are maintained in position between the annular drive member 212 and the splines 224 on the secondary output shaft 196 on the left by a first circular retaining plate 230 which may be secured to the annular member 212 by any appropriate means. A similar second circular retaining plate 232 is disposed to the right of the friction clutch plates 218 and 222. Disposed between the second circular retaining plate 232 and the circular drive member 208 is a circular compression spring 234. The compression spring 234 may be a Belleville or wave washer or similar spring device.

In operation, whenever torque is delivered by the drive chain 184 to the driven chain sprocket 192, that is, whether the interaxle differential 150 is providing differentiated drive torque or the locking clutch assembly 120 is operating, if torque delivered to the torque limiting assembly 190 is not in excess of a predetermined level, the friction plates 218 and 222 will carry torque therethrough and deliver it to the secondary output shaft 196. This is true as long as such torque transmission level remains below the preselected maximum torque throughput of the torque limiting assembly 190.

When torque in excess of the predetermined level is attempted to be transmitted through the torque limiting assembly 190, the friction clutch plates 218 and 222 will slip against one another and inhibit torque transfer through the assembly 190 in excess of the preselected or predetermined level. Adjustment of the compressive force provided by the compression spring 234 by either substituting a spring of a higher or lower spring rate or varying the extent or degree of compression of the spring 234 will vary the maximum torque throughput of the assembly 190. Such torque limiting will result in smoother operation and increased service life of the components of the secondary drive line.

Figure 4:
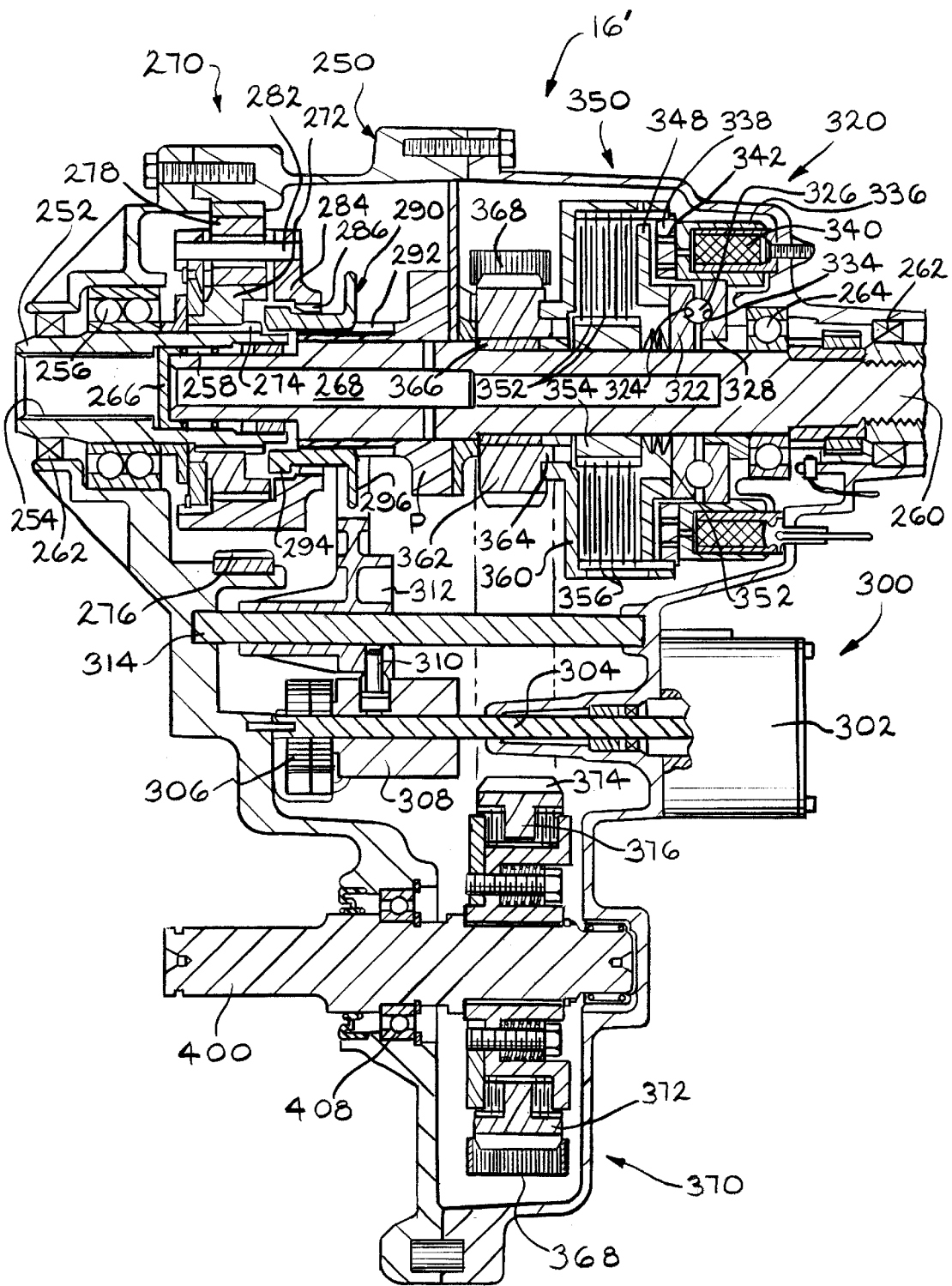
FIG. 4 is a full, sectional view of a transfer case incorporating a first alternate embodiment of the present invention.
Figure 5:
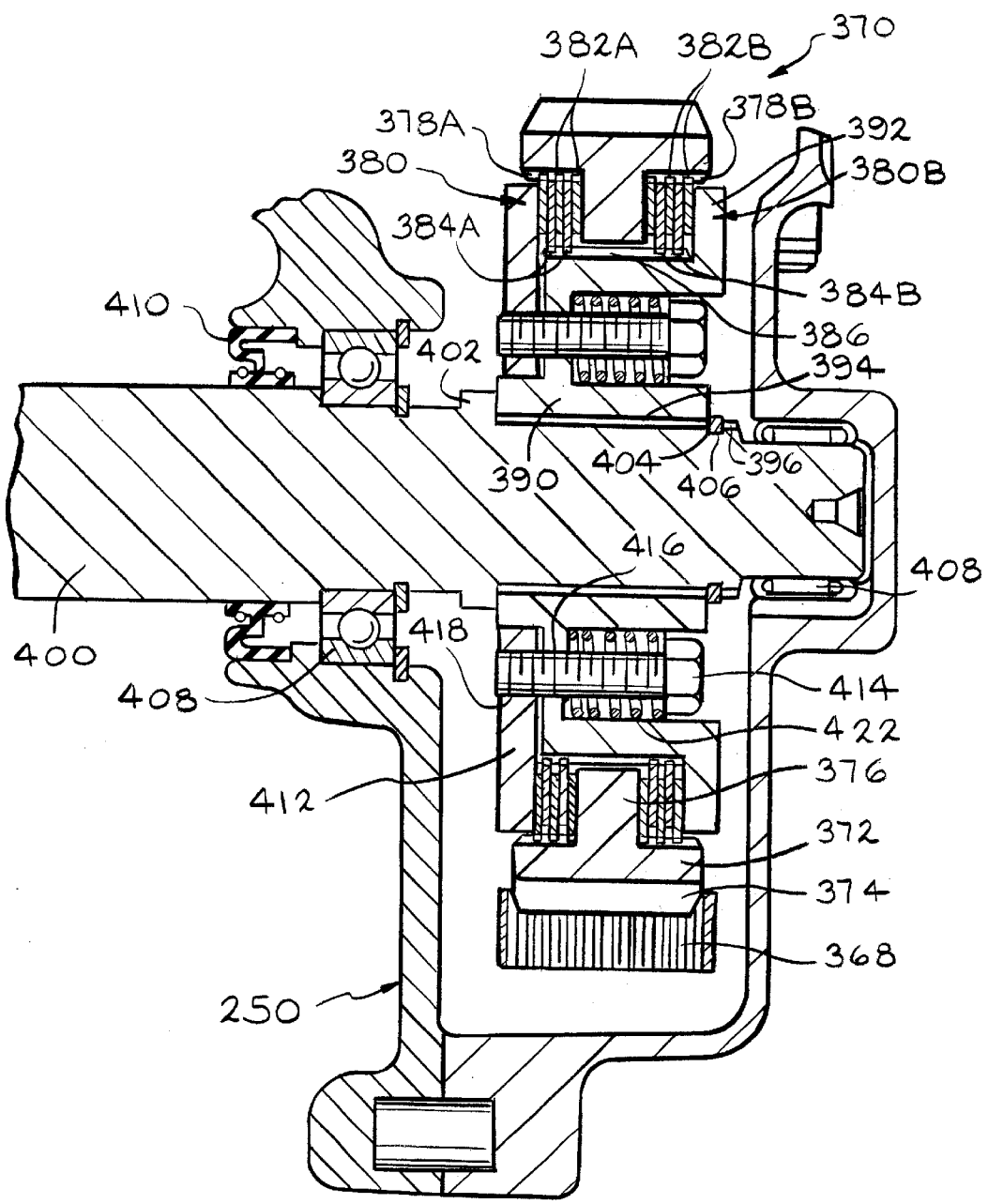
FIG. 5 is an enlarged, fragmentary, sectional view of a first alternate embodiment of a chain sprocket assembly according to the present invention.
Figure 6:
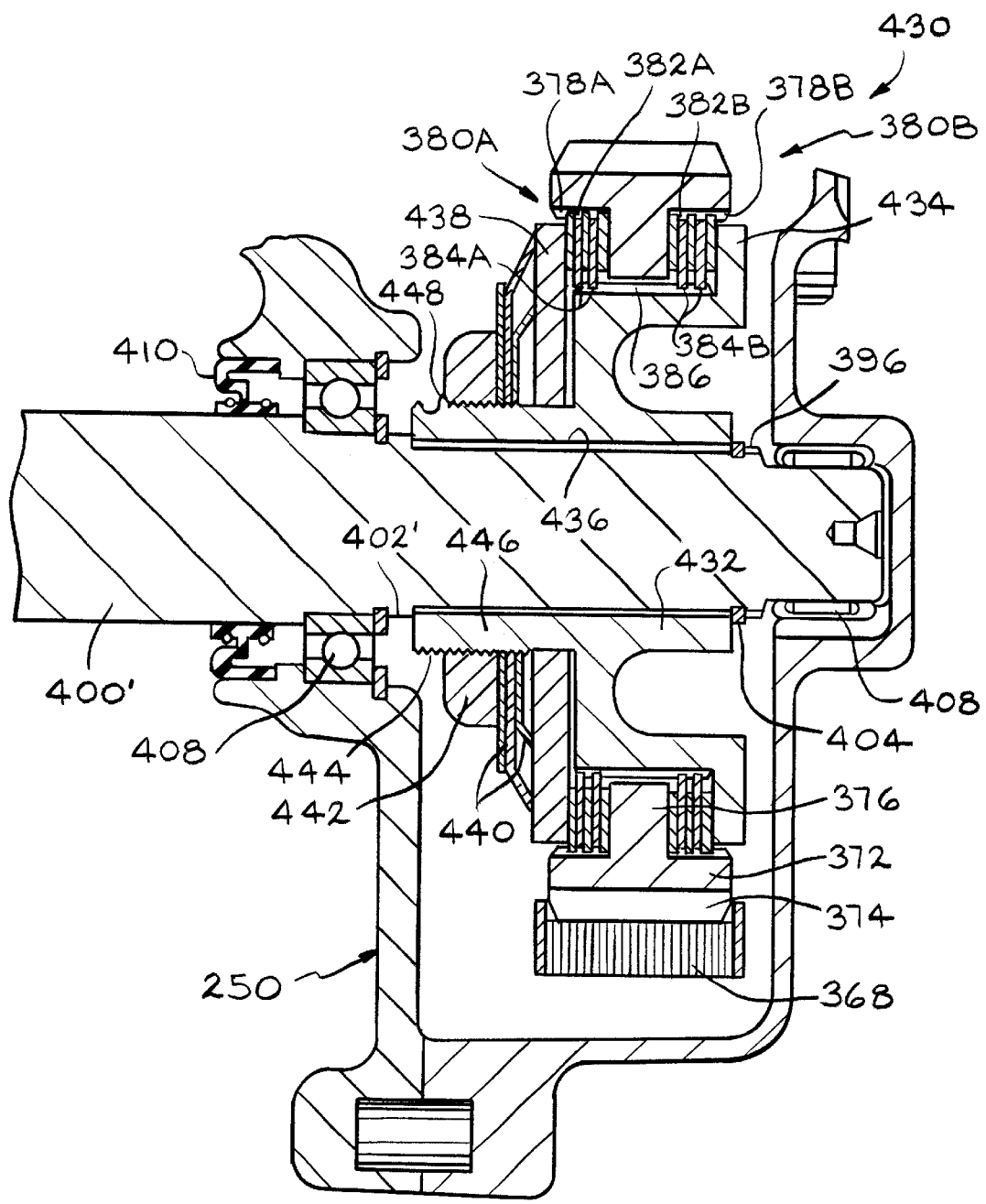
FIG. 6 is an enlarged, fragmentary, sectional view of a second alternate embodiment of a chain sprocket assembly according to the present invention

Referring now to FIGS. 4 and 5, a transfer case assembly incorporating a first alternate embodiment chain sprocket assembly 190 is illustrated and designated by the reference number 16'. The transfer case assembly 16' includes a multiple piece, typically cast, housing assembly 250 having planar and circular sealing surfaces, openings for shafts and bearings and various recesses, shoulders, flanges, counterbores and the like to receive various components and assemblies of the transfer case assembly 16. An input shaft 252 includes female or internal splines or gear teeth 254 or other suitable structure which drivingly couple an output of the transmission 14 illustrated in FIG. 1 to the input shaft 252. The input shaft 252 is rotatably supported by anti-friction bearings such as the bearing assemblies 256 and internally by an anti-friction bearing such as the roller bearing assembly 258. The roller bearing assembly 258 is disposed upon a reduced diameter portion of an output shaft 260. Suitable oil seals 262, positioned between the shafts 252 and 260 and the housing assembly 250, provide an appropriate fluid tight seal therebetween. The opposite end of the output shaft 260 is supported by an anti-friction bearing such as a ball bearing assembly 264. An end cap or seal 266 closes off the end of an axial passageway 268 in the output shaft 260. A gerotor pump P will typically be utilized to provide a flow of lubricating and cooling fluid to the axial passageway 268 which is thence distributed through a plurality of radial ports in the output shaft 260 to the components of the transfer case assembly 16'.

The transfer case assembly 16' also includes a two-speed planetary (epicyclic) gear speed reduction assembly 270 disposed generally about the input shaft 252. The planetary gear assembly 270 includes a sun gear 272 having internal splines or gear teeth which are engaged by complementary external splines or gear teeth 274 formed on the input shaft 252. Radially aligned with the sun gear 272 is a ring gear 276. The ring gear 276 is fixedly retained within the housing assembly 250 by any suitable retaining structure such as a snap ring (not illustrated). A plurality of pinion gears 278 are rotatably received upon a like plurality of anti-friction roller bearings which, in turn, are supported and located by a like plurality of stub shafts 282. The plurality of stub shafts 282 are mounted within and secured to a planet carrier 284. The planet carrier 284 includes a plurality of internal splines or gear teeth 286. The planetary gear assembly 270 is more fully described in co-owned U.S. Pat. No. 4,440,042 which is herein incorporated by reference.

Adjacent and cooperating with the planetary gear assembly 270 is a dog clutch 290 having elongate internal splines or gear teeth which are slidably received upon a complementary plurality of external splines or gear teeth 292 on the output shaft 260. The clutch collar 290 thus rotates with the output shaft 260 but may translate bi-directionally therealong. The clutch collar 290 also includes a set of external splines or gear teeth 294 on one end which are in all respects complementary to the internal splines or gear teeth 286 on the planet carrier 284. The end of the clutch collar 290 opposite the splines or gear teeth 294 defines a circumferentially and radially extending flange 296.

The clutch collar 290 is capable of three positions and operational modes. In FIG. 2, the clutch collar 290 is illustrated in its center or neutral position wherein both the input shaft 252 and the planet carrier 284 are disconnected from the output shaft 260 and no power is transmitted therebetween. When translated to the left, direct drive is achieved when the internal splines or gear teeth of the clutch collar 290 engage the external splines or gear teeth 274 on the input shaft 252 thereby directly coupling the input shaft 252 to the output shaft 260 and providing direct or high gear drive therebetween.

When the clutch collar 290 is moved to the right from the position illustrated in FIG. 2, the speed reduction achieved by the planetary gear assembly 270 is engaged through engagement of the external splines or gear teeth 294 on the clutch collar 290 with the internal splines or gear teeth 86 on the planet carrier 284. So engaged, the planetary gear assembly 270 is active and provides a speed reduction, typically in the range of from 3:1 to 4:1 between the input shaft 252 and the output shaft 260.

The position of the clutch collar 290 is commanded by an electric shift control assembly 300. The shift control assembly 300 includes an electric drive motor 302 which receives control signals or instructions originating with the switches or push buttons 48. The drive motor 302 has an output shaft 304 coupled, preferably through an energy storing spring 306, to a cam 308 which axially positions a cam follower 310. The cam follower 310 translates a shift fork 312 slidably disposed upon a shift rail 314 which engages the flange 296 of the dog clutch 290.

The transfer case assembly 16' also includes an electromagnetically actuated disc pack type clutch assembly 320. The clutch assembly 320 is disposed about the output shaft 260 and includes a circular drive member 322 coupled to the output shaft 260 through, for example, a splined interconnection. The circular drive member 322 includes a plurality of circumferentially spaced-apart recesses 324 in the shape of an oblique section of a helical torus. Each of the recesses 324 receives one of a like plurality of balls 326.

A circular driven member 328 is disposed adjacent the circular drive member 322 and includes a like plurality of opposed recesses 334 defining the same shape as the recesses 324. The oblique side walls of the recesses 324 and 334 function as ramps or cams and cooperate with the balls 326 to drive the circular members 322 and 328 apart in response to relative rotation therebetween. It will be appreciated that the recesses 324 and 334 and the balls 326 may be replaced with other analogous mechanical elements which cause axial displacement of the circular members 322 and 328 in response to relative rotation therebetween. For example, tapered rollers disposed in complementarily configured conical helices may be utilized.

The circular driven member 328 extends radially outwardly and is secured to a soft iron rotor 336. An armature 338 is disposed adjacent the rotor 336. The rotor 336 surrounds an electromagnetic coil 340 on three sides. Both the rotor 336 and the armature 338 include arcuate discontinuous slots 342 which enhance magnetic attraction therebetween.

Providing electrical energy to the electromagnetic coil 340 causes magnetic attraction of the armature 338 to the rotor 336 which results in frictional contact between the armature 338 and the rotor 336. When the output shaft 260 is turning at a different speed than the armature 338, this frictional contact results in a frictional torque being transferred from the output shaft 260, through the circular drive member 322, through the balls 326 and to the circular driven member 328. The resulting frictional torque causes the balls 326 to ride up the ramps of the recesses 324 and 334, causing axial displacement of the circular drive member 322.

Axial displacement of the circular drive member 322 translates an apply plate 348 axially toward a disc pack clutch assembly 350. A compression spring 352 which may comprise a stack of Belleville washers provides a restoring force which biases the circular drive member 322 toward the circular driven member 328 and returns the balls 326 to center positions in the circular recesses 324 and 334 to provide maximum clearance and minimum friction between the components of the electromagnetic clutch assembly 320 when it is deactivated.

The disc pack clutch assembly 350 includes a first plurality of smaller friction plates or discs 352. The first plurality of discs 352 are coupled by interengaging splines to a clutch hub 354 which is coupled by interengaging splines to the output shaft 260 for rotation therewith. A second plurality of larger friction plates or discs 356 are coupled to an annular housing 360 by interengaging splines for rotation therewith and are interleaved with the first plurality of friction discs 352. Preferably, one face or surface of each of the friction plates or discs 352 and 356 includes friction clutch material in accordance with conventional clutch practice.

The annular housing 360 is disposed concentrically about the output shaft 260 and is coupled to a chain drive sprocket 362 by a plurality of interengaging teeth, splines or lugs and recesses 364. The chain drive sprocket 162 is freely rotatably disposed on the output shaft 260 and is supported by a journal or needle bearing assembly 366. When the clutch assembly 320 is engaged, it transfers energy from the output shaft 260 to the chain drive sprocket 362. A drive chain 368 is received upon the chain drive sprocket 362 and engages and transfers rotational energy to a first alternate embodiment torque limiting chain sprocket assembly 370.

Referring now to FIGS. 2 and 3, the first alternate embodiment torque limiting chain sprocket assembly 370 includes a chain sprocket collar 372 having chain teeth 374 about its circumference which receive and engage the drive chain 368. The chain sprocket collar 372 also includes an inwardly extending annular flange 376. The annular flange 376 is axially centered on the chain sprocket collar 372. Extending axially away from the annular flange 376 on both inside faces of the chain sprocket collar 372 are left and right (first and second) sets of internal or female splines or gear teeth 378A and 378B. The sets of splines or gear teeth 378A and 378B are associated with left and right (first and second) friction clutch pack assemblies 380A and 380B disposed on opposite sides of the annular flange 376. Each of the clutch packs 380A and 380B includes a set of larger diameter friction clutch plates or discs 382A and 382B which engage the respective sets of female splines or gear teeth 378A and 378B and therefore rotate therewith. Sets of smaller friction clutch plates or discs 384A and 384B are interleaved with the friction clutch plates or discs 382A and 382B, respectively, and engage a plurality of external or male splines or gear teeth 386 disposed on a circular clutch member 390. In accordance with conventional practice, one face or surface of each of the friction plates or discs 382A, 382B, 384A and 384B includes friction clutch material.

The circular clutch member 390 includes an outwardly extending radial flange 392 which engages and restrains the right friction clutch pack 380B. The clutch member 390 also defines a plurality of internal or female splines or gear teeth 394 which engage complementarily configured external or male splines or gear teeth 396 on a secondary output shaft 400. The circular clutch member 390 is maintained axially in position on the secondary output shaft 400 by a shoulder 402 and a snap ring 404 which seats within a suitable channel 406 in the secondary output shaft 400. The secondary output shaft 400 is rotatably supported in the housing assembly 250 on a pair of anti-friction bearings 408 which may be either roller bearing assemblies or ball bearing assemblies as illustrated. An oil seal 410 provides a fluid tight seal between the secondary output shaft 400 and the housing assembly 250.

On the left side of the chain sprocket assembly 370 engaging the left friction clutch pack 380A is a circular plate 412. The circular plate 412 is secured to the circular clutch member 390 by a plurality of threaded fasteners 414, two of which are illustrated in FIG. 3, which extend through suitable openings 416 in the clutch member 390 and into threaded openings 418 in the circular plate 412. Compression springs 422 reside about the threaded fasteners 416 and provides a biasing force to the right as illustrated in FIG. 3 which compresses the friction clutch packs 380A and 380B against the radial flange 392 of the clutch member 390. Preferably, six of the threaded fasteners 414 and associated components are utilized in an equally spaced (60° intervals) array about the axis of the secondary output shaft 400 although more or fewer of the threaded fasteners 414 and associated components may be utilized if desired.

It will be appreciated that rotation of the threaded fasteners 414 to increase or reduce the compressive force applied to the two friction clutch packs 380A and 380B will increase or decrease the frictional coupling between the chain sprocket collar 372 and the secondary output shaft 400 thereby increasing or decreasing the maximum torque which may be transmitted through the sprocket assembly 370 before the clutch assemblies 380A and 380B slip.

Turning now to FIG. 4, a second alternate embodiment torque limiting chain sprocket assembly 430 is illustrated. The second alternate embodiment torque limiting chain sprocket assembly 430 is similar in many respects to the first alternate embodiment chain sprocket assembly 370 and includes the chain sprocket collar 372 having the chain teeth 374, the axially centered annular flange 376 and left and right (first and second) internal or female splines or gear teeth 378A and 378B. The second alternate embodiment chain sprocket assembly 430 also includes left and right (first and second) friction clutch pack assemblies 380A and 380B which include larger diameter splined friction plates or discs 382A and 382B which engage the splines 378A and 378B, respectively, as well as smaller diameter friction clutch plates or discs 384A and 384B which engage the external or male splines or gear teeth 386 on a circular clutch member 432.

The circular clutch member 432 includes a radially and circumferentially extending flange 434 and defines internal or female splines or gear teeth 436 which are received upon external or male splines or gear teeth 396 on a secondary output shaft 400'. The circular clutch member 432 is axially positioned and restrained upon the secondary output shaft 400' by a shoulder 402' and a snap ring 404 received within a circular channel 406. The secondary output shaft 400' is supported by anti-friction bearings 408 and is sealed by an oil seal 410. Adjacent the left (first) friction clutch pack assembly 180A is a circular pressure plate 438, which with the radial flange 434, traps and applies pressure to the left and right friction clutch packs 380A and 380B. Adjacent the circular pressure plate 438 is a stack of two or more Belleville washers 240 which are maintained in position by a threaded lock nut 242. The threaded lock nut 442 is received upon male threads 444 residing on a cylindrical extension 446 of the circular clutch member 432.

Adjustment of the maximum torque throughput of the second alternate embodiment chain sprocket assembly 430 is achieved by rotating the lock nut 442 relative to the circular clutch member 434 to a adjust the compressive force applied to the friction clutch packs 380A and 380B. When a desired maximum level of torque throughput is achieved, the lock nut 442 may be staked at a location 448 or secured in some other fashion, such as a second nut or an adhesive, to the cylindrical extension 446 to maintain its position and torque setting.

In operation, the main clutch of the transfer case assembly 161 which may be either a two position (on-off), typically, mechanical clutch, an overrunning clutch, a viscous clutch or a hydraulically or electromagnetically actuated modulatable disc pack clutch such as the assembly 320 illustrated, is engaged to provide drive torque to the secondary drive line 30. Such drive torque is provided through the first or drive chain sprocket 362 to the second or driven sprocket collar 372 of the torque limiting chain sprocket assembly 370.

Should the tire and wheel assemblies 38 of the secondary or front drive line 30 encounter a traction condition vastly different from the conditions encountered by the tire and wheel assemblies 28 of the rear or primary drive line assembly 20 or any other driving condition anomaly exist such that torque in excess of a desired limit could be delivered to the front or secondary tire and wheel assemblies 38 through the secondary drive line 30, the friction clutch pack assemblies 380A and 380B transfer torque up to their maximum calibrated and selected limit and then permit the secondary output shaft 400 to rotate at a different speed than the chain sprocket collar 372, i.e., slip, while transferring torque therethrough at the desired and pre-selected level.

It should be appreciated that although the preferred and alternate embodiment chain sprocket assemblies 190, 370 and 430 have been described as located upon the secondary output shafts 196, 400 and 400', respectively, at the drive end of the chain 184 or 368, the chain sprocket assemblies 190, 370 and 430 may also be located upon the intermediate shaft 60 in the preferred embodiment, or the primary output shaft 260 in the alternate embodiment, at the drive end of the chain 184 or 368. So disposed, in the preferred embodiment, the clutch plate 222 will be disposed upon and driven by a member similar to the chain drive sprocket 180 and, in the alternate embodiments, the circular members 390 and 432 will be driven by the housing (output member) 360 of the clutch assembly 320 and the chains 184 and 368 will drive the respective secondary output shafts 196, 400 and 400' through a chain sprocket directly coupled thereto.

It will be appreciated that the second alternate embodiment torque limiting chain sprocket assembly 430 functions essentially in the same manner.

It will also be appreciated that the torque limiting chain sprocket assemblies 170, 370 and 430 provide unique operational features and benefits not achieved by prior transfer cases and clutches such as the inter-axle differential assembly 150 or the modulating clutch assembly 320 illustrated and described or the on-off, overrunning or viscous clutches referenced. For example, a modulating clutch is typically activated and modulated as a function of front to rear speed differences resulting from wheel spin or slip. The torque limiting chain sprocket assemblies 170, 370 and 430, however, control or limit only maximum torque passing therethrough and delivered to the secondary axles 36 and the secondary tire and wheel assemblies 38.

Finally, it should be appreciated that although a relatively nonadjustable torque limiting chain sprocket assembly 190 has been disclosed in conjunction with a transfer case 16 having an inter-axle differential assembly 150 and that adjustable torque limiting chain sprocket assemblies 370 and 430 have been described in conjunction with a transfer case 161 having a clutch drive to the secondary drive line assembly 30, these devices and features are readily interchanged or substituted and the scope of the present invention should be seen to include such various combinations.

The foregoing disclosure is the best mode devised by the inventor for practicing this invention. It is apparent, however, that devices incorporating modifications and variations will be obvious to one skilled in the art of motor vehicle drive systems. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:
1. A torque limiting assembly for a motor vehicle transfer case having a primary output member, a secondary drive member and a secondary output member, comprising, in combination,
   a pair of chain sprockets,
   one of said chain sprockets associated with said secondary drive member and another of said chain sprockets associated with said secondary output member,
   a chain engaging said pair of chain sprockets, and
   a clutch assembly associated with one of said chain sprockets and having a first plurality of friction clutch plates coupled for rotation with said one of said chain sprockets, a second plurality of friction clutch plates interleaved with said first plurality of friction clutch plates and means for providing compressive force to said pluralities of clutch plates.
2. The torque limiting assembly of claim 1 wherein said second plurality of friction clutch plates is coupled for rotation with one of said secondary drive member and said secondary output member.
3. The torque limiting assembly of claim 1 further including an inter-axle differential having a first output driving said primary output member and a second output driving said secondary drive member.
4. The torque limiting assembly of claim 1 wherein said means for providing compressive force is a Belleville spring.
5. The torque limiting assembly of claim 1 wherein said another of said chain sprockets is rotatably disposed on said secondary output member.
6. The torque limiting assembly of claim 1 wherein said second plurality of friction clutch plates is coupled to said secondary output member.
7. The torque limiting assembly of claim 1 wherein said secondary output member includes splines engaged by said second plurality of friction clutch plates.
8. A motor vehicle transfer case having a torque limiting chain sprocket assembly comprising, in combination,
   an inter-axle differential having an input, a primary output and a secondary output,
   a secondary output member,
   a pair of chain sprockets, one of said chain sprockets associated with said secondary output and another of said chain sprockets associated with said secondary output member,
   a chain engaging said pair of chain sprockets, and
   a torque limiting clutch assembly operably associated with one of said chain sprockets, said torque limiting clutch assembly including a first plurality of friction clutch plates coupled for rotation with said one of said chain sprockets, a second plurality of friction clutch plates interleaved with said first plurality of friction clutch plates and spring means for compressing said pluralities of friction clutch plates.
9. The motor vehicle transfer case of claim 8 wherein said spring means is a Belleville spring.
10. The motor vehicle transfer case of claim 8 further including a pair of plates for engaging said pluralities of friction clutch plates.
11. The motor vehicle transfer case of claim 8 wherein said another of said chain sprockets is rotatably disposed on said secondary output member.
12. The motor vehicle transfer case of claim 8 wherein said second plurality of friction clutch plates is coupled to said secondary output member.

13. The motor vehicle transfer case of claim 8 wherein said secondary output member includes splines engaged by said second plurality of friction clutch plates.

14. A transfer case having a torque limiting clutch comprising, in combination,
- an inter-axle differential having an input, a primary output adapted to drive a primary drive line and a secondary output,
- a first chain sprocket coupled to said secondary output,
- a second chain sprocket,
- a chain engaging said first chain sprocket and said second chain sprocket,
- a secondary output member adapted to drive a secondary drive line, and
- a torque limiting clutch associated with one of said chain sprockets, said torque limiting clutch including a first plurality of clutch plates coupled for rotation with said one of said chain sprockets, a second plurality of clutch plates interleaved with said first plurality of clutch plates and coupled for rotation with said secondary output member and a spring for providing compressive force to said pluralities of clutch plates.

15. The transfer case of claim 14 wherein said clutch plates include friction material.

16. The transfer case of claim 14 wherein said spring is a Belleville spring.

17. The transfer case of claim 14 wherein said inter-axle differential includes a sun gear, planet gears and a planet gear carrier.

18. The transfer case of claim 14 wherein another of said chain sprockets is rotatably disposed on said secondary output member.

19. The transfer case of claim 14 wherein said second plurality of friction clutch plates is coupled to said secondary output member.

20. The transfer case of claim 14 wherein said secondary output member includes splines engaged by said second plurality of friction clutch plates.

* * * * *